June 11, 1929.  F. HOFMANN  1,716,890
INLET VALVE FOR COMBUSTION TURBINES
Filed May 28, 1926
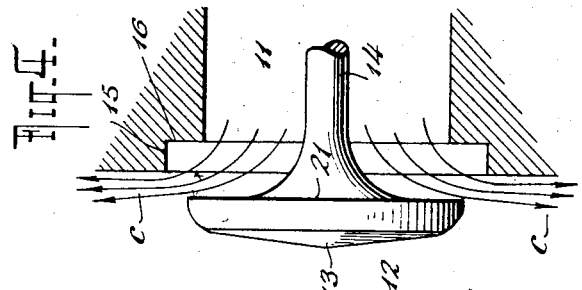
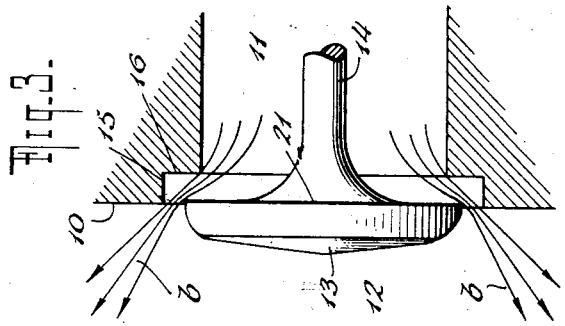
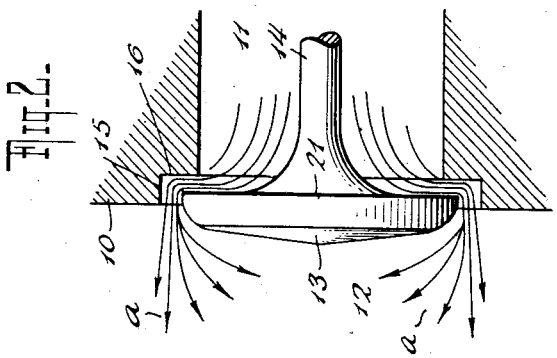
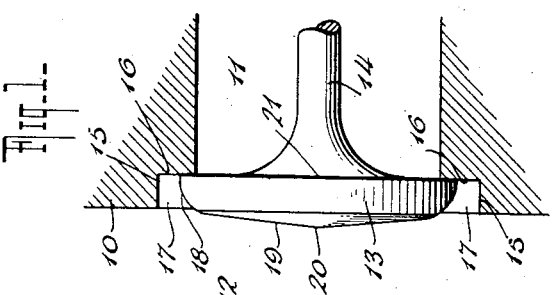
INVENTOR
FRIEDRICH HOFMANN
BY
ATTORNEYS Patented June 11, 1929.

1,716,890

UNITED STATES PATENT OFFICE.

FRIEDRICH HOFMANN, OF MULHEIM-RUHR, GERMANY, ASSIGNOR TO HOLZWARTH GAS TURBINE CO., OF SAN FRANCISCO, CALIFORNIA, A CORPORATION OF DELAWARE.

INLET VALVE FOR COMBUSTION TURBINES.

Application filed May 28, 1926. Serial No. 112,200.

My invention relates to inlet valves for combustion turbines of the Holzwarth type, which include combustion chambers of relatively large interior area. It is essential to the efficient operation of combustion turbines of this class that the combustion chambers be evenly and quickly filled with the explosive mixture prior to an explosion, and that they be evenly and quickly filled with scavenging air subsequent to such explosion. The object of the present invention is to provide an inlet valve arrangement of simple construction whereby these results are efficiently attained. Other more specific objects will appear from the description hereinafter.

In the accompanying drawing which shows an example of the invention without defining its limits, Fig. 1 is a diagrammatic sectional view showing my improved valve in closed position; Fig. 2 shows the valve in partially open position; Fig. 3 shows the valve opened to a still further degree; and Fig. 4 illustrates the same in completely open position.

In the drawing, 10 represents a portion of the customary valve casing provided with a channel 11 communicating with the interior of the combustion or explosion chamber 12 and connected in any conventional way with a source of fuel and with a source of scavenging air under pressure. The passage alternately of the fuel and of the scavenging air from the channel 11 to the interior of the combustion chamber 12 is controlled by means of the valve 13 carried by a stem 14 and operated in a predetermined manner by suitable mechanism which may be of any well-known type. In the illustrated example, the valve casing 10 is formed with an annular recess 15 the bottom 16 of which constitutes the valve seat which cooperates with the valve 13 to close the communication between the channel 11 and the interior 12 of the combustion chamber at the proper time. The depth of the recess 15 in the direction of the axis of the valve 13 is such that the end face of the valve lies substantially flush with the inner face of the valve casing 10 when the valve 13 is in the closed position illustrated in Fig. 1. Furthermore, the diameter of the recess 15 is sufficiently greater than the external diameter of the valve 13 to provide an annular channel 17 between the periphery of the valve 13 and the wall of the recess 15 when said valve is in its closed position, as shown in Fig. 1. The valve 13 is formed with a rounded peripheral edge 18 and has its end surface 19 preferably of conical form converging toward a central apex 20.

As the valve 13 is operated in a direction to open it into the combustion chamber 12, it will assume the partly opened position shown in Fig. 2 and thereby will permit the inflow of the supply of fuel or scavenging air, as the case may be, into the combustion chamber 12, to begin. The aforesaid fuel or scavenging air will be deflected by the inner face of the valve 13 into the annular channel 17 and will pass through the space formed between the peripheral surfaces of the valve and the recess 15 so as to be directed into the chamber 12. As indicated by the arrows $a$ in Fig. 2, the current of fuel or air in part will pass around the rounded edge 18 and will be directed thereby toward the center of the combustion chamber, as represented by the axial line of the valve. As the opening movement of the valve 13 is continued, the position in Fig. 3 will be reached in which the current of fuel or air will now be directed in outward directions relatively to the periphery of the valve 13, as indicated by the arrows $b$. When the valve 13 assumes its final open position indicated in Fig. 4 of the drawings, the inner surface 21 thereof will lie inwardly beyond the inner surface of the valve casing 10 so as to be spaced therefrom. In this position of the valve, the current of fuel or air will be deflected by the inner surface 21 of the valve 13 at approximately right angles to the axis of the valve and along the inner surface of the valve casing 10, as indicated by the arrows $c$ in Fig. 4. In other words, the current of fuel and air is first directed into the combustion chamber in a stream which passes around the periphery of the valve and is deflected by the wall of the recess 15 in a direction approximately parallel with the axis of the valve and at the same time is caused to spread inwardly from this line toward said axis. Continuing, the current of fuel or air is then caused to flow into the combustion chamber in an expanding stream which diverges into the chamber 13 from the inner peripheral edge of said valve, as indicated in Fig. 3, and finally is caused to spread along the inner surface of the valve casing 10 and the inner wall of the combustion chamber in outward directions as indicated in Fig. 4. In order to ensure the flow in the direction represented by the arrows in Fig. 4, it is desirable that the difference between the valve stroke and the depth of the annular passage equals substantially the width of said passage. If this requirement is complied with, the cross-section of the current leaving the valve in the direction of the arrows $c$ in Fig. 4 is substantially the same as that of the current represented by the arrows $b$ in Fig. 3 and $a$ in Fig. 2. It is evident that if the valve stroke were substantially larger than shown in Fig. 4 the air current would not be directed along the walls of the combustion chamber and, what is much more important, would be expanded in so large a cross-section that its resulting speed would be insufficient for an effective scavenging or injection of the fuel. As the valve describes a return movement and gradually shifts back from the fully opened position indicated in Fig. 4 to the fully closed position shown in Fig. 1, the reverse operation takes place. That is to say, the current of air or fuel will continue to be spread along the inner surface of the valve casing 10 and of the combustion chamber 12 until the valve again reaches the position shown in Fig. 3 when the direction of the fuel or air will be as indicated by the arrows $b$ followed by a flow of the fuel or air, as indicated by the arrows $a$ when the valve again reaches the position shown in Fig. 2, the flow of fuel or air being completely cut off when the final closed position shown in Fig. 1 is reached.

It will be understood that the changes in the character of the flow of fuel or air as indicated by the arrows $a$, $b$ and $c$ are continuous and gradual so that the current of fuel or air is caused to spread fan-like in the combustion chamber from one extreme position to the other and back again. As a result of this arrangement, the fuel or air is first directed principally to those portions of the combustion chamber lying behind or in registry with the valve 13 and then principally in a sidewise or diverging direction to fill the space lying beyond the area of the combustion chamber defined by lines forming axial continuations of the peripheral surface of the valve and finally in outward directions principally at right angles to the axis of the valve. As a result, the entire interior of the combustion chamber 12 is completely filled either with fuel or with scavenging air, as the case may be, thus bringing about a condition for the production of an explosion of maximum efficiency or a complete and full scavenging of the products of combustion from said combustion chamber.

Various changes in the specific form shown and described may be made within the scope of the claims without departing from the spirit of my invention.

I claim:

1. In an explosion turbine, the combination of a combustion chamber, a channel communicating therewith, an annular recess surrounding the mouth of said channel, the bottom of said annular recess being substantially plane and constituting a valve seat, a valve cooperating with said seat to control the communication between said channel and combustion chamber, said valve being so much smaller in diameter than said recess as to define therewith an annular passage the width of which exceeds the half of the depth of said recess.

2. In an explosion turbine, the combination of a combustion chamber, a channel communicating therewith, an annular recess surrounding said channel at its point of connection with said chamber, the bottom of said recess constituting a valve seat, a valve cooperating with said seat to control the communication between said channel and said chamber, the depth of said recess and the width of said valve at its periphery being such that the end surface of said valve lies approximately flush with the surface of said combustion chamber when said valve is in its closed position, said valve being provided with a conical end surface having a rounded peripheral edge for deflecting the fuel or air in a predetermined manner.

3. In an explosion turbine, the combination of a combustion chamber, a channel communicating therewith, an annular recess surrounding the mouth of said channel, the bottom of said annular recess being substantially plane and constituting a valve seat, a reciprocating valve cooperating with said seat to control the communication between said channel and combustion chamber, said valve being so much smaller in diameter than said recess as to define therewith an annular passage, the width of which corresponds approximately to the difference between the valve stroke and the depth of said annular passage.

In testimony whereof I have hereunto set my hand.

FRIEDRICH HOFMANN.